Patented Apr. 8, 1941

2,237,866

UNITED STATES PATENT OFFICE 2,237,866

PREPARATION OF DIOLEFINS

Henri Martin Guinot, Niort, Deux-Sevres, France, assignor to Les Usines De Melle, Melle, Deux-Sevres, France, a joint-stock company of France No Drawing. Application February 20, 1939, Serial No. 257,538. In France March 21, 1938

12 Claims. (Cl. 260—681)

This invention relates to the preparation of diolefins from the corresponding glycols or olefinic alcohols or mixtures of these compounds. For the purposes of the present specification and claims the term "olefinic alcohols" means monohydric alcohols having one double bond.

The different methods at present used for the dehydration of these substances to give diolefinic hydrocarbons (and particularly for the dehydration of 1.3 butene glycol to give butadiene) are all based upon the passage of the glycol or alcohol through a furnace, maintained at a convenient temperature and provided with a solid catalyst.

The most diverse substances have been mentioned as catalysts, for example, calcium phosphates, potassium alum, and alumina, but they all have the disadvantage of possessing a relatively short active life, of becoming rapidly poisoned and of giving a diolefin which is less and less pure.

It has been found that these disadvantages can be avoided by using as catalysts small amounts of volatile substances.

The process for the preparation of diolefins by the catalytic dehydration of glycols or olefinic alcohols or mixtures of these compounds, according to the present invention, is, therefore, one in which there are used as catalysts a small amount of a volatile substance which is either added directly to the glycol or alcohol to be treated or injected separately in the zone of reaction.

According to the preferred embodiment of the process, the volatile substance used as catalyst is one containing phosphorus. The volatile phosphorus-containing substances used for the purposes of the present invention are not limited to organic phosphorus-containing compounds, but include inorganic phosphorus-containing compounds. The preferred substances are the phosphoric esters and phosphorus oxychloride. Amongst the phosphoric esters, triethyl phosphates are particularly convenient for carrying out the present process but it is within the scope of the invention to utilise phosphoric esters derived from other alcohols, saturated or unsaturated, or again to use esters of other phosphoric acids. Besides the substances specified above, phosphorus trichloride and pentachloride may be also used with advantage but they give rise to yields which are not quite so high, as those obtained from the use of the foregoing substances.

The proportion of catalyst to be used varies according to the operating conditions and the nature of the catalyst chosen. In a general way it suffices, in order to obtain the desred effect, to add to the feed glycol a proportion of catalyst below 2%.

Example 1

1.3 butene glycol at a temperature of 300°-350°, is sent into an empty furnace made of quartz or non-corrosive steel, which is vertically arranged, electrically heated at its circumference and furnished in its upper part with porcelain pellets which act as a vaporiser. Simultaneously triethylphosphate vapors are injected into the furnace in an amount equal to 0.5% of the amount of glycol. By this means 90% of the glycol used is converted into butadiene, the purity of the butadiene obtained from the first run being 90%.

Example 2

The procedure is as in Example 1, but 0.2% of phosphorus oxychloride is added to the 1.3 butylene glycol as catalyst and the entire interior of the furnace is provided with inert matter like pumice stone or wood charcoal, which permits a better transference of heat. The yield of butadiene is 85%, with a purity of 90%.

It has also been found that once the reaction has been initiated, a minimum quantity of catalyst (e. g. $\frac{1}{5}$ to $\frac{1}{20}$ of the initial amount of catalyst) suffices to maintain it, at least during a certain time, which varies according to the nature of the selected catalyst and the conditions of operation.

Thus instead of supplying the furnace in a continuous manner with glycol containing 0.5% of triethyl phosphate as in Example 1, the reaction may be initiated by supplying 1.5% of catalyst for several minutes, and then maintained with only 0.1% of triethyl phosphate. When after a certain time the reaction has lost its activity, a temporary augmentation of the proportion of catalyst suffices to re-establish the initial activity. It is within the scope of the invention to employ, for maintaining the reaction, a different catalyst from that which serves to initiate it, for example, phosphorus oxychloride when the initial catalyst was triethyl phosphate.

In the course of the dehydration in the two examples just given, there is formed as a by-product a small quantity of olefinic alcohols (crotonyl alcohol, allyl carbinol and methyl vinyl carbinol) which are returned with the feed glycol, after rectification, with the object of transforming them ultimately into butadiene.

It has been found that the catalysts, used in accordance with the present invention, allow the conversion into diolefins, with the greatest ease, of olefinic alcohols and particularly crotonyl alcohol, the dehydration of which by means of the usual solid catalysts presents certain difficulties in practice.

*Example 3*

A furnace identical with that of the foregoing examples is fed with crotonyl alcohol, prepared for example by careful hydrogenation of crotonaldehyde and to which there has been preliminarily added 0.5% of phosphoric trichloride. The amount of conversion into butadiene, in a single run, is 50%, the gas obtained from the first run having butadiene purity of 85%. After rectification the unconverted crotonyl alcohol is returned to the furnace.

The process applies equally to the treatment of olefinic alcohol and glycols having more than four carbon atoms. Thus by dehydrating methyl-butene-glycol by means of the volatile catalysts according to the invention, good yields of isoprene are obtained.

Finally, although the employment of the volatile catalysts according to the present invention allows dehydration to be effected at atmospheric pressure it is to be understood that the present invention includes operation at a different pressure; this has been found to be advantageous in certain cases.

I claim:

1. A process for the preparation of diolefins by the catalytic dehydration of a compound selected from the group comprising the corresponding glycols and olefinic alcohols, which comprises essentially using as a catalyst a phosphorus-containing substance in a vapor state and adding said catalyst in small proportion to the starting material.

2. A process for the preparation of diolefins by the catalytic dehydration of a compound selected from the group comprising the corresponding glycols and olefinic alcohols, which comprises essentially using as a catalyst a substance in a vapor state selected from the group comprising esters of phosphorus-containing acids, phosphorus oxychloride, phosphorus trichloride and phosphorus pentachloride.

3. A process for the preparation of diolefins by the catalytic dehydration of a compound selected from the group comprising the corresponding glycols and olefinic alcohols, which comprises essentially using as a catalyst an organic phosphorus-containing substance in a vapor state and adding said catalyst directly and in small proportion to the starting material.

4. A process for the preparation of diolefins by the catalytic dehydration of a compound selected from the group comprising the corresponding glycols and olefinic alcohols, which comprises essentially using as a catalyst an inorganic phosphorus-containing substance in a vapor state and injecting said catalyst independently and in small proportion to the reaction zone.

5. A process for the preparation of diolefins by the catalytic dehydration of a compound selected from the group comprising the corresponding glycols and olefinic alcohols which comprises essentially using as a catalyst an inorganic phosphorus-containing substance in a vapor state, adding said catalyst directly and in small proportion to the starting material and reducing said quantity of catalyst after said dehydration has been initiated.

6. A process for the production of diolefins by the catalytic dehydration of the corresponding glycols, which comprises essentially feeding said glycols through a heated furnace in admixture with a small proportion of a phosphorus-containing compound in a vapor state as a catalyst, separating the diolefin formed from unsaturated alcohols also formed as byproducts and returning said unsaturated alcohols to said furnace for ultimate conversion into diolefins.

7. In a process for the preparation of diolefins by the dehydration of a compound selected from the group comprising the corresponding glycols and olefinic alcohols, the steps of using as a catalyst a phosphorus-containing substance in a vapor state, adding said catalyst directly and in small proportion to the starting material and establishing a pressure other than atmospheric in the zone of reaction.

8. A process for the preparation of diolefins by the dehydration of a compound selected from the group comprising the corresponding glycols and olefinic alcohols, which comprises essentially using as a catalyst a substance in a vapor state selected from the group comprising esters of phosphorus-containing acids, phosphorus oxychloride, phosphorus trichloride and phosphorus pentachloride in an amount which is not more than 2% of said compound.

9. A process for the preparation of diolefins by the catalytic dehydration of a compound selected from the group comprising the corresponding glycols and olefinic alcohols which comprises essentially using as a catalyst up to 2% of a phosphorus-containing substance in a vapor state, adding said catalyst directly to the starting material of the reaction and reducing said quantity of catalyst by from one-tenth to one-twentieth after said reaction has been initiated.

10. A process for the preparation of diolefins by the catalytic dehydration of a compound selected from the group comprising the corresponding glycols and olefinic alcohols which comprises essentially using as a catalyst up to 2% of a phosphorus-containing substance in a vapor state, adding said catalyst directly to the starting material until said reaction has been initiated and thereafter supplying, as a catalyst, a different phosphorus-containing substance in a vapor state from that first used, to maintain the reaction, in an amount which is from one-tenth to one-twentieth of that of the catalyst first used.

11. A process for the preparation of diolefins by the catalytic dehydration of a compound selected from the group comprising the corresponding glycols and olefinic alcohols which comprises essentially using as a catalyst an organic phosphorus-containing substance in a vapor state, adding said catalyst directly and in small proportion to the starting material and reducing said quantity of catalyst after said dehydration has been initiated.

12. A process for the preparation of diolefins by the catalytic dehydration of a compound selected from the group comprising the corresponding glycols and olefinic alcohols which comprises essentially using as a catalyst a phosphorus-containing substance in a vapor state, injecting said catalyst independently into the reaction zone in small proportion to the starting material and reducing said quantity of catalyst after said dehydration has been initiated.

HENRI MARTIN GUINOT.